United States Patent

Wagner et al.

(10) Patent No.: US 9,045,168 B2
(45) Date of Patent: Jun. 2, 2015

(54) VEHICLE ROOF BRACE

(75) Inventors: Darrin Neil Wagner, Bloomfield Hills, MI (US); Duncan Whipps, Grosse Pointe Farms, MI (US); Bruno Barthelemy, Ann Arbor, MI (US); Srinivasan Sundararajan, Ann Arbor, MI (US); Fubang Wu, Rochester Hills, MI (US); Mohammed Omar Faruque, Ann Arbor, MI (US); Leonard Anthony Shaner, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 13/248,735

(22) Filed: Sep. 29, 2011

(65) Prior Publication Data

US 2013/0082484 A1 Apr. 4, 2013

(51) Int. Cl.
*B62D 25/06* (2006.01)
*B62D 31/00* (2006.01)
*B62D 27/02* (2006.01)

(52) U.S. Cl.
CPC .............. *B62D 25/06* (2013.01); *B62D 27/02* (2013.01); *B62D 31/00* (2013.01)

(58) Field of Classification Search
CPC ...... B62D 25/06; B62D 27/02; B62D 23/005; B62D 27/023; B62D 31/00
USPC ................... 296/30, 187.03, 187.12, 187.13, 296/193.02, 193.05, 193.06, 203.01, 210, 296/216.06
See application file for complete search history.

(56) References Cited

U.S. PATENT DOCUMENTS

| | | | |
|---|---|---|---|
| 5,671,968 A | 9/1997 | Masuda et al. | |
| 6,003,898 A * | 12/1999 | Teply et al. | 280/785 |
| 6,012,764 A | 1/2000 | Seksaria et al. | |
| 6,073,992 A | 6/2000 | Yamauchi et al. | |
| 7,243,985 B2 | 7/2007 | Yatabe et al. | |
| 7,407,222 B2 | 8/2008 | Anderson et al. | |
| 7,543,884 B2 | 6/2009 | Reed et al. | |
| 7,614,686 B2 | 11/2009 | Robertson et al. | |
| 7,758,107 B2 | 7/2010 | Ratsos et al. | |
| 7,758,109 B2 | 7/2010 | Reed et al. | |
| 2007/0187991 A1* | 8/2007 | Mori | 296/187.12 |
| 2008/0030050 A1 | 2/2008 | Chen et al. | |
| 2008/0116714 A1* | 5/2008 | Timmermans et al. | 296/178 |
| 2009/0071737 A1* | 3/2009 | Leonard et al. | 180/68.4 |

FOREIGN PATENT DOCUMENTS

JP 2005059649 A 3/2005

* cited by examiner

*Primary Examiner* — Jason S Daniels
(74) *Attorney, Agent, or Firm* — L.C. Begin & Associates, PLLC

(57) ABSTRACT

A roof support for a vehicle is provided containing a first side roof rail; a transverse roof bow fixed to and extending from the first side roof rail; and a first brace fixed to the first side roof rail at a forward point on the first side roof rail, wherein the first brace extends to the transverse roof bow and is fixed to a first aft point on the transverse roof bow, thereby advantageously defining a first angle between the first side roof rail and the first brace. The roof support may further include a second side roof rail opposite the first side roof rail such that the roof bow laterally extends from the first side roof rail to the second side roof rail, wherein a second brace is connected in like manner.

19 Claims, 3 Drawing Sheets

VEHICLE ROOF BRACE

TECHNICAL FIELD

The present invention relates generally to automotive roofs, and more specifically, to an enhancement to the roof resulting in support advantages.

BACKGROUND OF THE INVENTION

The present invention generally relates to automotive roof design that upon the advent of a side pole collision inhibits or prevents the intrusion of a roof rail into the interior of the vehicle. The post-collision space within the vehicle is therefore increased thereby enhancing the occupant safety. Because there is always an emphasis on increased vehicle safety, the potential for the roof rail to intrude into the vehicle interior during a side pole collision is desirably mitigated or eliminated.

In certain vehicle roof "green house" architectures, the roof may be designed with a roof rail system supported by the front header at an A-pillar and a roof bow at a B-pillar, for example. In these types of designs there is typically no direct transverse load path available at the point where the pole or tree may impact the roof rail. In the absence of such a load path, it is difficult to laterally transfer loads to the roof bow and header efficiently thereby limiting roof rail intrusion.

One method of increasing the strength of known roof structures is to increase the size, thickness, and weight of the various roof components, and enhance their material structure by more exotic alloys known for their respective strengths or toughness, for example. Limiting intrusion through an increase in sheet metal thicknesses is generally considered to be inefficient in terms of weight, for any structural members that may be subjected to transverse loadings. Section sizes, on the other hand, are often limited by the vehicle styling, binocular vision, and also by weight constraints. Taken alone or in combination, these options increase the manufacturing cost and complexity and are therefore effective, but more costly.

Because lighter-weight vehicular bodies are a primary constraint for all current and future roof designs, the development of new architecture that mitigates roof rail intrusion must be efficiently achieved, while minimizing the associated weight.

SUMMARY OF THE INVENTION

The above-referenced concerns are resolved by a "green house" architecture that efficiently manages the transverse load upon a side pole or tree impact, without substantially adding to the weight of the vehicle.

A roof support for a vehicle may include a first roof rail extending along a length of the vehicle; a roof bow laterally extending from the first roof rail; a front header laterally extending from said first roof rail; and a first brace fixed to the first roof rail at a third point between the roof bow and the front header. The first brace extends to the roof bow and is fixed to a first point on the roof bow, thereby defining a first angle between the first roof rail and the first brace. The vehicle roof support may also include a second roof rail opposite the first roof rail such that the roof bow and the front header both extend from the first roof rail to the second roof rail in substantial parallel relation to each other. A second brace may also be provided and fixed to the second roof rail between the roof bow and the front header, the second brace extending to the roof bow and fixed to a second point on the roof bow, thereby defining a second angle between the second roof rail and the second brace.

The angular relationship between the roof rails and the braces provides a lateral load management from the roof rails to the header and the roof bow. Increasing the distance between the point of attachment of the brace on the roof rail and the roof bow is believed to increase the lateral load transferred from the side roof rail to the front header, during a side pole or side tree impact collision.

DETAILED DESCRIPTION OF THE PREFERRED EMBODIMENT(S)

Figure 1:
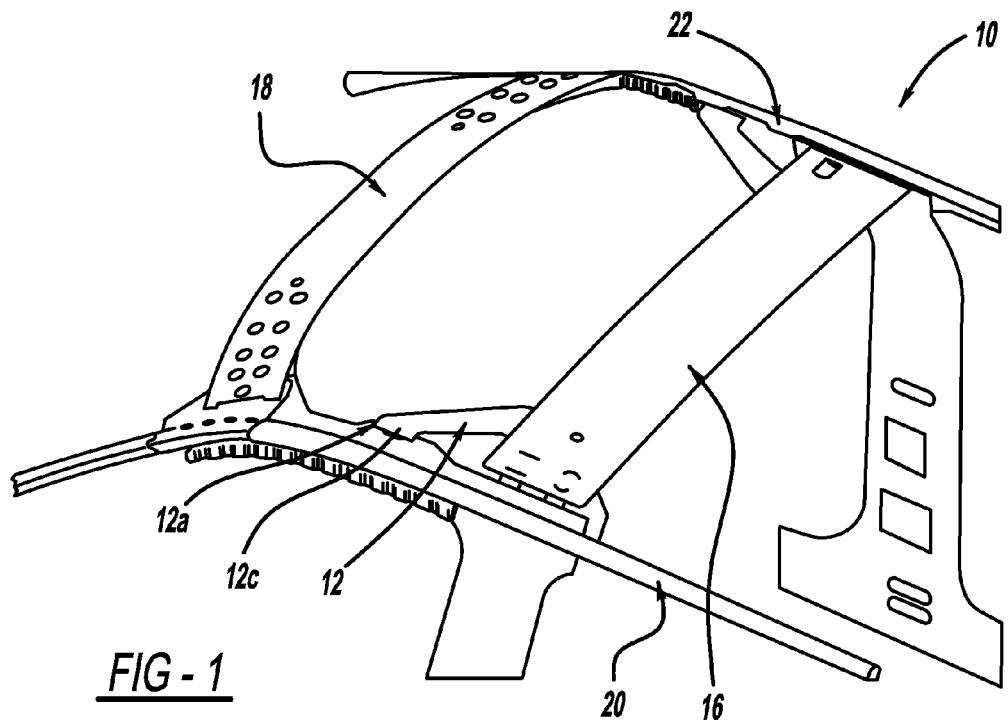
FIG. 1 is a perspective view of a roof assembly containing a roof brace in accordance with the present invention.

FIG. 1 illustrates a roof assembly 10 containing a roof brace 12, in accordance with one embodiment of the present invention. As with other conventional "green house" architecture for roof assemblies, the present roof assembly contains a roof bow or transverse roof bow 16 that laterally extends across an upper portion 102 of the vehicle 100. In one embodiment, a front header 18 may also be contained within the roof assembly 10, also in lateral extension across an upper portion 102 of the vehicle 100. A first side roof rail or a left side roof rail 20 may be positioned along the length of the roof assembly 10, along the left side 104 of the vehicle 100. A second side roof rail or a right side roof rail 22 may be positioned along the length of the roof assembly 10, along the right side 106 of the vehicle 100.

Figure 2:
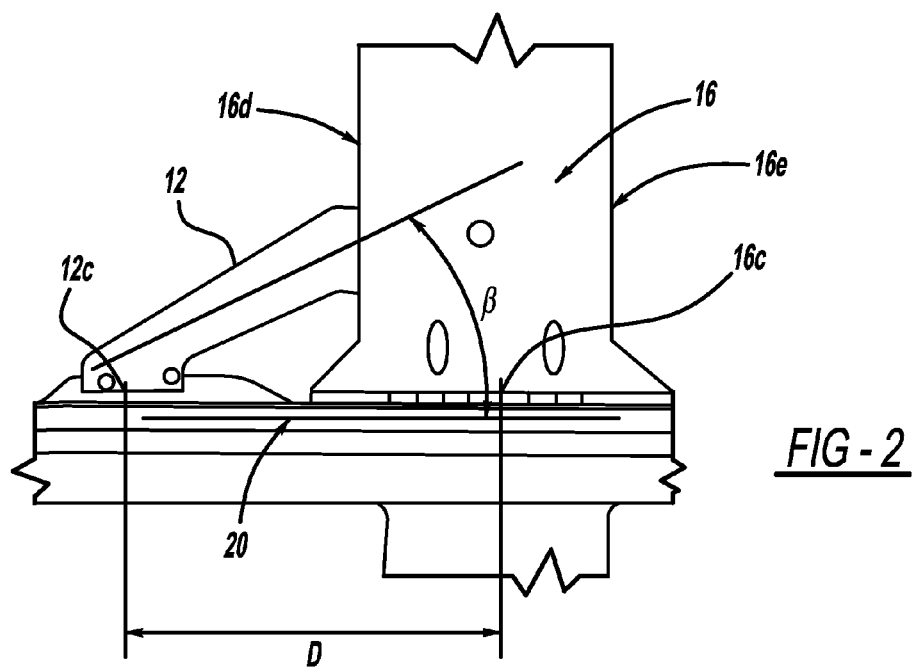
FIG. 2 is a blown-up view of the roof brace shown in FIG. 1, in accordance with the present invention.
Figure 5:
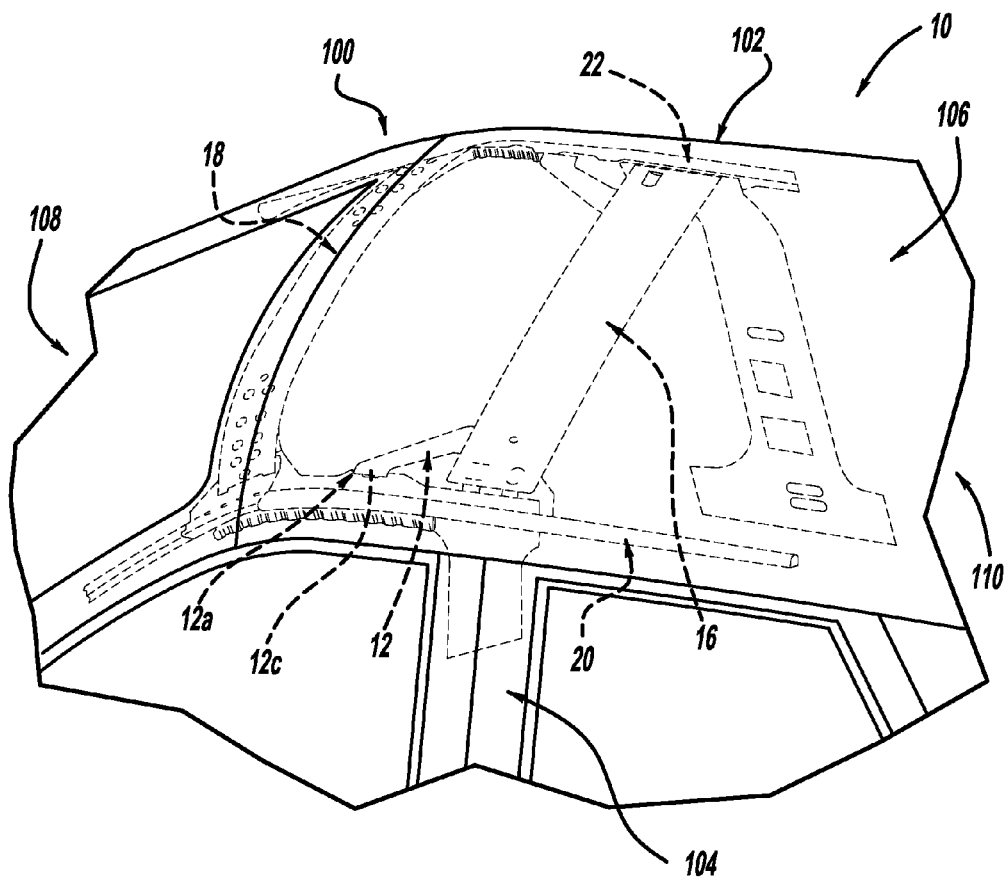
FIG. 5 is view of the roof brace within a roof assembly within a vehicle, in accordance with the present invention.

FIG. 2 represents a magnified view of the brace 12 of FIG. 1 and illustrates one embodiment of the present invention. Referring to FIGS. 2 and 5, the roof brace 12 is fixed at a first end 12a to a first forward point 20a on the side roof rail 20, wherein the term "forward" indicates a more forward position, or relatively more proximate to the front 108 of the vehicle 100 and/or the front header 18 of the roof assembly 10. In the embodiment shown, the first forward point 20a is located on an underside 20b of the side roof rail 20. As also shown in FIG. 2 the roof brace 12 is also fixed at a second end 12b to a first aft point 16a on the roof bow 16, wherein the term "aft" indicates a more rearward position, or relatively more proximate to the rear 110 of the vehicle 100 as compared to the forward point 20a.

As further shown in FIG. 2, an angle β is defined between the brace 12 (as it extends from the side roof rail 20 to the roof bow 16) and the side roof rail 20. The angle β is preferably 30 degrees or more, thereby providing an advantageous load transfer from the side rail 20 to the front header 16 upon a side pole or tree collision, for example. It will be appreciated that the roof brace 12 may be riveted, welded, bolted, or otherwise fixed to the side rail 20 and the roof bow 16, depending on the material used in the construction of each of these constituents. As also shown in FIG. 2, a first dimension D is defined between a first midpoint 12c on first end 12a of brace 12, and a second midpoint 16c on roof bow 16. As shown in FIG. 2, a first lateral edge 16d and a second lateral edge 16e frame the midpoint 16c on roof bow 16. In accordance with yet another aspect of the invention, the brace 12 may be tailored in length and angular relationship to iteratively or otherwise result in an optimum load transfer to the front header 18 and the roof bow 16. Various design criteria such as the size of the vehicle and the materials used may, for example only, be determinative of either the angular relationship defined by β, the dimension D, or both. As the length D is increased for example, more lateral load is believed to be transferred to the front header 16 during a side pole crash event.

Figure 3:
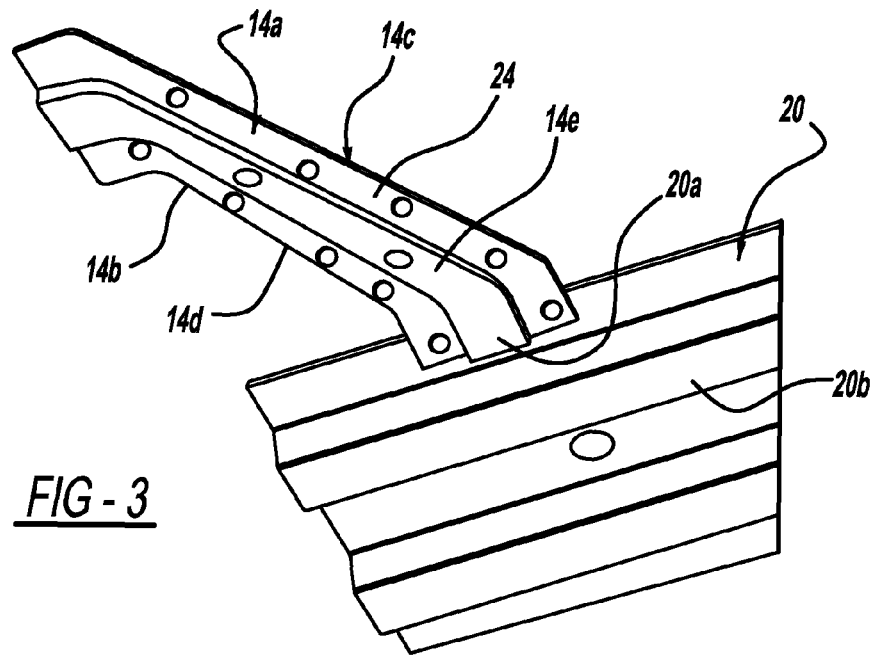
FIG. 3 is a back view of a roof brace, in accordance with the present invention.

As shown in FIGS. 2 and 3, for example, the roof brace 12 may contain one or more arms 14a and 14b. As shown in FIG. 3, an upper or first arm 14a may be assembled with a lower or second arm 14b. Upper arm 14a may be overlaid or stacked over lower arm 14b, and then riveted, welded, bolted, or otherwise fixed to lower arm 14b. As the two arms are joined together, an upper or first flange or edge 14c of upper arm 14a may be present along the length of upper arm 14a. Conversely, a lower or second flange or edge 14d of lower arm 14b may be present along the length of lower arm 14b, opposite to flange 14c. A channel 14e may be formed along a median portion of the assembled arms 14a and 14b, thereby enhancing the strength and rigidity of the brace 12.

As also shown in the FIGURES, the roof brace 12 may be attached to the underside 20b of side roof rail 20 and to the underside 16b of the roof bow 16. When assembled with the roof assembly 10 in this manner, the brace 12 may be designed as a two-piece closed section structural member packaged between the roof panel and the interior roof trim.

Figure 4:
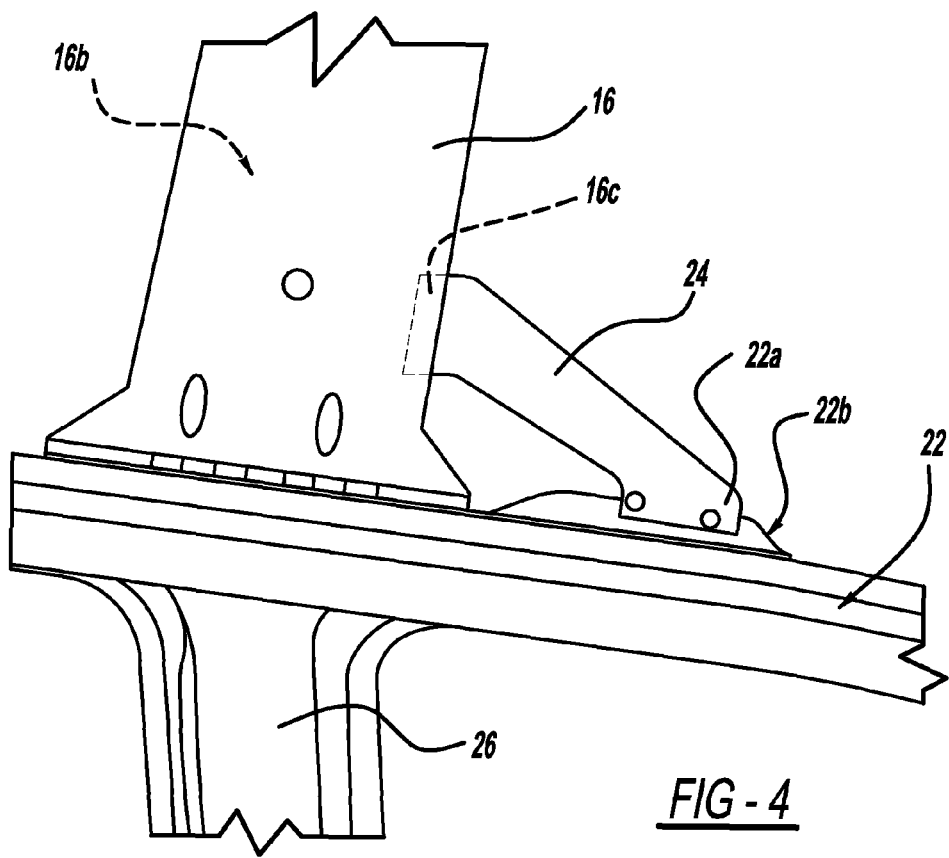
FIG. 4 is a perspective view of the connections of the roof brace to the transverse roof bow and to the roof side rail.

As further shown in FIGS. 1 and 4, an end 24a of a second roof brace 24 may be fixed to a second forward point 22a on the underside 22b of second side roof rail 22, and may also be fixed to a second aft point 16c on the underside 16b of the roof bow 16. The second roof brace 24 may be formed and designed as first roof brace 12, and may be fastened in the same way as first roof brace 12. The terms "aft" and "forward" relative to second brace 24 carry the same meanings as provided relative to the first brace 12. Again, fixing or joining the brace 24 to roof rail 22 and roof bow 16 may be achieved by self-pierced rivets or resistance spot welding, for example. As shown in FIG. 4, the roof bow 16 is exemplified as a B-pillar roof bow, wherein the roof bow 16 is joined to the side rail 22 to be aligned with or juxtaposed with an adjacent B-pillar 26.

As described in U.S. Pat. Nos. 7,758,109, 7,543,884, and 7,758,107, the teachings of which are herein incorporated by reference, the components of the roof assembly 10 including braces 12 and 14, side rails 20 and 22, front header 16, and roof bow 18 may be roll-formed, hydro-formed, and/or otherwise formed depending on the material composition of each constituent. The various components may be manufactured from any standard material including, in the way of examples, steel, aluminum, composites, nylon and magnesium, and manufactured from any known process including hot-stamping, cold stamping, hydroforming, and extrusion, for example.

In yet another aspect of the invention, and with reference to the FIGURES, a method of transferring load distribution within a roof assembly is provided as follows:
  providing a first side roof rail 20;
  providing a transverse roof bow extending from the first side roof rail 16;
  providing a front header 18 extending from the first side roof rail 20;
  attaching a first end 12a of a first brace 12 to the first side roof rail 20, between the header 18 and the roof bow 16; and
  attaching a second end 12b of the first brace 12 to the roof bow 16, thereby forming an angle β1 between the first brace 12 and the first side roof rail 20.

Further steps of the load distribution method that may also be provided include:
  providing a second side roof rail 22 opposite the first side roof rail 20, with the transverse roof bow 16 and the front header 18 attached thereto;
  attaching a first end 24a of a second brace 24 to the second side roof rail 22, between the header 18 and the roof bow 16; and
  attaching a second end 24b of the first brace 12 to the roof bow 16, thereby forming an angle β2 between the second brace 24 and the second side roof rail 22, wherein β1 and β2 may or may not be equal, and wherein the respective lengths of roof brace 12 and roof brace 24 may or may not be equal.

The present description is for illustrative purposes only, and should not be construed to limit the breadth of the present invention in any way. Thus, those skilled in the art will appreciate that various modifications and/or equivalents could be made to the presently disclosed embodiments without departing from the scope of the present invention, as defined in the appended claims.

What is claimed is:

1. A roof assembly for an upper portion of a vehicle, said roof assembly comprising:
  a first roof rail and a second roof rail extending along a length of said vehicle;
  a monolithic roof bow laterally extending from said first roof rail to said second roof rail;
  a front header laterally extending from said first roof rail in said upper portion; and
  a first brace having a first end and a second end,
  said first end fixed to said first roof rail at a location between said roof bow and said front header, said first brace extending to said roof bow and said second end fixed to a said roof bow only at a first joint spaced apart from a vertical plane extending through a central longitudinal axis of the vehicle,
  wherein said first roof rail extends aft of said roof bow.

2. The roof assembly of claim 1
  wherein the first brace includes a connecting portion extending between the first and second ends, wherein the first end extends from the connecting portion in a direction substantially perpendicular to a direction in which the side roof rail extends, and wherein the second end extends from the connecting portion in a direction substantially perpendicular to a direction in which the roof bow extends.

3. The roof assembly of claim 2 wherein the connecting portion forms and angle greater than thirty degrees with the first roof tail.

4. The roof assembly of claim 1 wherein said first brace comprises an upper member and a lower member fixed to said upper member, said upper member overlaid or stacked over said lower member.

5. The roof assembly of claim 4 wherein said upper member is welded or riveted to said lower member.

6. The roof assembly of claim 4, wherein said brace further comprises:
  a first flange formed along a first edge of said upper member;

a second flange formed along a second edge of said lower member; and a channel formed between said first flange and said second flange.

7. The roof assembly of claim 1 further comprising a first support pillar fixed adjacent to an end of said roof bow.

8. The roof assembly of claim 1 wherein a first angle is defined between said first brace and said first roof rail and said first angle is greater than thirty degrees.

9. The roof assembly of claim 1 further comprising:
a first midpoint defined between opposite edges of the first brace first end;
a second mid point defined between first and second lateral edges of said roof bow adjacent said first roof rail; and
a first dimension defined between said first mid point and said second mid point, said dimension sized to transfer a predetermined amount of lateral load from the first rail to the front header upon a side pole impact.

10. The vehicle roof assembly of claim 1 wherein said first angle is greater than thirty degrees.

11. A brace for connecting a transverse roof cross member to a roof side rail in an automotive vehicle, the brace comprising:
a first end, a second end and a connecting portion extending between the first and second ends, the first end being structured to extend from the connecting portion at an angle with respect to the connecting portion and perpendicular to said roof side rail, the second end being structured to extend from the connecting portion at an angle with respect to the connecting portion and perpendicular to said roof bow,
wherein said brace is fastenable to said transverse roof cross member.

12. The brace of claim 11 wherein the connecting portion is structured to extend at an angle greater than thirty degrees with respect to the side roof rail when the first and second ends are attached to the vehicle.

13. A roof support for a vehicle comprising:
a first side roof rail;
a transverse roof bow fixed directly to and extending from said first side roof rail; and
a first brace having a first end and a second end, said first end fixed to said first side roof rail at a location between the roof bow and a front header extending from the first roof rail, said first brace extending to said transverse roof bow and said second end fixed only to said roof bow, such that a force impinging on the first side roof rail between the roof bow and the front header is transferred via the first brace to a first location on the roof bow spaced apart from a vertical plane extending through a central longitudinal axis of the vehicle,
wherein said first brace is fastenable to said transverse roof bow.

14. The roof assembly of claim 13 wherein said first brace comprises an upper member and a lower member fixed to said upper member, said upper member overlaid or stacked over said lower member.

15. The roof support of claim 13 further comprising:
a second side roof rail opposite said first side roof rail such that said transverse roof bow extends from said first side roof rail to said second side roof rail; and
a second brace having a third end and a fourth end, said third end fixed to said second side roof rail at a location between the roof bow and the front header said second brace extending to and said fourth end fixed to said transverse roof bow, such that a force impinging on the second side roof rail between the roof bow and the front header is transferred via the second brace to a second location on the roof bow spaced apart from the vertical plane.

16. The roof assembly of claim 15 wherein said second brace comprises a second upper member and a second lower member fixed to said second upper member, said second upper member overlaid over said lower member.

17. The roof support of claim 15 wherein said first and second braces are of equal length,.

18. The roof support of claim 15 wherein said first brace and/or said second brace is formed from a single arm.

19. The roof support of claim 15 wherein said first brace and/or said second brace contains a u-shaped channel.

* * * * *